United States Patent [19]

Miyazawa et al.

[11] Patent Number: 4,777,077

[45] Date of Patent: Oct. 11, 1988

[54] BASE FILM FOR THREE-DIMENSIONAL CONFORMABILITY

[75] Inventors: Kazushi Miyazawa; Takao Terauchi, both of Tokyo; Keiji Hanamoto, Miyoshi; Fumio Takagi, Tokyo, all of Japan

[73] Assignee: Dai Nippon Insatsu Kabushiki Kaisha, Tokyo, Japan

[21] Appl. No.: 779,124

[22] Filed: Sep. 23, 1985

[30] Foreign Application Priority Data

Sep. 26, 1984 [JP] Japan ................ 59-201141

[51] Int. Cl.⁴ .................. B32B 3/00; B32B 5/16; C08F 220/12

[52] U.S. Cl. .................. 428/200; 428/412; 428/475.2; 428/476.9; 428/483; 428/518; 428/520; 428/525; 428/519; 264/299; 525/301; 526/329.3

[58] Field of Search ............ 428/525, 200, 412, 475.2, 428/476.9, 483, 520, 518

[56] References Cited

U.S. PATENT DOCUMENTS

| 3,637,414 | 1/1972 | Newman et al. | 428/913 X |
| 4,426,422 | 1/1984 | Daniels | 428/520 X |
| 4,663,216 | 5/1987 | Toyoda et al. | 428/476.9 |

Primary Examiner—P. C. Ives
Attorney, Agent, or Firm—Parkhurst, Oliff & Berridge

[57] ABSTRACT

A film which combines excellent vacuum formability, excellent heat resistance during injection molding and excellent dimensional stability during printing of the film, and which can be suitably used as a base of a transfer film for three-dimensional conformability capable of satisfactorily printing onto the surface of an article having a complex three-dimensional shape.

4 Claims, 1 Drawing Sheet

BASE FILM FOR THREE-DIMENSIONAL CONFORMABILITY

BACKGROUND OF THE INVENTION

This invention relates to a base film for three-dimensional conformability, and more particularly, to a film suitable as a base for transfer films or affixture films for three-dimensional conformability which combines excellent vacuum formability, heat resistance during injection molding and dimensional stability during printing of the film.

Application of three-dimensional printing onto the surface of a plastic article molded by a method such as injection molding has been carried out by transferring or affixing at the same time as molding. Of course, the film used in this transfer or affixture must have a three-dimensional shape which conforms to the shape of its article.

In the case of a transfer film, it is produced by first laminating, onto a plane base film, a releasable layer, a printing layer, and an adhesive layer in this order, and then subjecting the laminate to vacuum forming into a desired three-dimensional shape. Accordingly, it is necessary that the base film has good dimensional stability during printing, that its vacuum forming is easily carried out, and that the base film does not melt during injection molding.

Films which have heretofore been used as the film base are films of materials such as nylon, polyester, polypropylene, and polyvinyl chloride. While the nylon film has excellent vacuum formability and heat resistance, its tensile strength is weak and therefore its dimensional stability during printing is low. While the oriented polyester film has high dimensional stability during printing, its percent elongation is low and the vacuum formability at a temperature of about 100° C. is inferior. While the rigid polyvinyl chloride film has good dimensional stability during printing and good vacuum formability, its heat resistance is inferior. For such reasons, there is no film which meets all of the requirements described above, although the realization of such a film has long been desired.

SUMMARY OF THE INVENTION

It is an object of the present invention to provide a film which satisfies the requirements described above.

According to the present invention, there is provided a base film for three-dimensional conformability which combines dimensional stability during printing of the film, good vacuum formability, and good heat resistance during injection molding.

Figure 1:
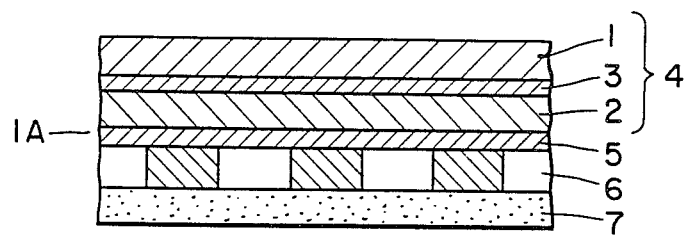
FIG. 1 is an enlarged sectional view of an example of a transfer film which is obtained by using a multilayer film of the present invention as a base.

Throughout this disclosure, quantities expressed in percentages or parts are by weight unless otherwise indicated.

DETAILED DESCRIPTION OF THE INVENTION

The terms with respect to the physical properties of a film as used herein are defined as follows:

(1) Dimensional Stability

The percent elongation of a film at a drying temperature during printing (80° C. or below) is 5% or less.

(2) Formability

The draw ratio at a temperature of at least 100° C. is ½ or above.

(3) Heat Resistance

No melting occurs even if the film comes into contact with a molten resin (140° C. or above) injected from an injection molding machine.

An example of a film according to the present invention is a single layer film formed from a copolymer of from 80% to 95% of acrylonitrile and from 20% to 5% of an alkyl (meth)acrylate. We have found that a base film for three-dimensional conformability which combines dimensional stability during printing, vacuum formability and heat resistance can be obtained by using a copolymer having the monomer composition described above as a material from which a base film is produced.

If the acrylonitrile component in the copolymer from which a base film is produced is less than 80%, the necessary heat resistance cannot be obtained. A representative example of the alkyl (meth)acrylate is methyl methacrylate, which reduces the softening temperature of the base film to improve vacuum formability. This effect is obtained by the presence of at least 5% of the alkyl (meth)acrylate. If the amount of the alkyl (meth)acrylate is more than 20%, the base film will be elongated at the drying temperature during printing (about 100° C. or below), and thus its dimensional stability during printing cannot be obtained. Accordingly, the monomer ratio described above is selected. The representative monomer composition is 90% of acrylonitrile and 10% of methyl methacrylate.

A further example of a film for three-dimensional conformability according to the present invention which is formed into a single layer comprises a resin blend of from 50% to 90% of a polyethylene terephthalate resin and from 50% to 10% of a heat-resistant thermoplastic resin.

The heat-resistant thermoplastic resins which can be used in this invention are selected from polyphenylene oxide, polyacetals, polycarbonates, polyarylates, polyamides, polyfluoroethylene, and polymethyl methacrylate. acrylate.

If the amount of the polyethylene terephthalate resin in the blend which is formed into the base film is less than 50%, the necessary vacuum formability cannot be obtained. If the amount thereof is more than 90%, the necessary heat resistance cannot be obtained. If the amount of the heat-resistant thermoplastic resin is more than 50%, the necessary vacuum formability cannot be obtained. If the amount thereof is less than 10%, the necessary heat resistance cannot be obtained.

It is preferable that the base film be molded by a casting process in consideration of vacuum formability. The thickness of the base film is at least 30 microns. If the thickness of the base film is less than 30 microns, the film will be elongated during vacuum forming, and wrinkles are liable to be formed. The upper limit of the thickness of the base film is desirably about 80 microns from the standpoint of cost.

A printing layer can be provided on such a single layer film. Further, when a transfer film is produced from such a single layer film, a releasable layer, a printing layer and an adhesive layer are sequentially laminated on this film.

The releasable layer applied as coating on the base film is formed from materials suitably selected from thermoplastic resins such as polymethacrylates, polyvinyl chloride, rubber chloride, polyvinylidene chloride, and acrylonitrile-styrene copolymers.

An ink composition printed on the releasable layer has adhesive properties relative to both the releasable layer and an adhesive layer provided on the printing layer. For example, an ink composition based on resins such as chlorinated polypropylene, ethylene-vinyl acetate copolymer, vinyl chloride-vinyl acetate copolymer, and acrylic resins is suitable.

A heat-sensitive adhesive layer is finally provided. An adhesive having good adhesion properties with respect to a material to be transferred is selected from thermoplastic resins such as polyvinyl acetate, polyvinyl alcohol, polyvinyl acetal, polyvinyl chloride, acrylic resins, polyethylene, and cellulose; and elastomer adhesives such as nitrile rubbers, styrene rubbers, and butyl rubbers.

Each of the layers described above are formed onto the base film according to techniques already known in the production of a heat transfer film.

A transfer film for three-dimensional conformability which combines dimensional stability during printing, vacuum formability and heat resistance can be obtained by using the single layer film comprising the copolymers or resin blends as described above, as the base film.

The film of the present invention can also be formed into a multi-layer structure. For example, it can be formed by laminating a synthetic resin film layer having dimensional stability and formability, and a synthetic resin film layer having heat resistance and vacuum formability. When a transfer film is produced using the present film which is a two-layer laminate, a first synthetic resin film layer having dimensional stability and formability, a second synthetic resin film layer having heat resistance and formability, an optional releasable layer and a printed pattern layer are sequentially laminated as shown in FIG. 1.

Referring to drawings, a film according to the present invention and a transfer sheet produced therefrom will be described in detail. As shown in FIG. 1, in a transfer sheet 1A which is the most preferred embodiment of the present invention, two synthetic resin film layers, namely, a first synthetic resin film layer 1 having dimensional stability and formability and a second synthetic resin film layer 2 having heat resistance and vacuum formability are laminated together via an interposed adhesive layer 3 to form a laminate 4. This laminate 4 is then provided with a releasable layer 5 formed on the outer surface of the synthetic resin film layer 2. A printed pattern layer 6 is then formed on the outer surface of the releasable layer 5, and an adhesive layer 7 is further formed on the surface of the printed pattern layer 6.

The layers 1 through 7 described above will be described in detail hereinafter.

It is necessary that the first synthetic resin film layer 1 support the second synthetic resin film layer 2 to reinforce the laminate 4, thereby imparting dimensional stability necessary in printing to the laminate 4 (via the releasable layer as needed). It is also necessary that the first synthetic resin film layer 1 have formability equal to that of the second synthetic resin film layer 2, or such a formability that it is not substantially reduced during laminating. Exemplary materials of the first synthetic resin film layer 1 include polyvinyl chloride resin films (particularly unplasticized resins or rigid resins containing 5 PHR of a plasticizer), acrylic resin films such as polymethyl methacrylate resin films, non-oriented polyethylene terephthalate resin films, and non-oriented polypropylene resin films.

It is necessary that the second synthetic resin film layer 2 have formability, and heat resistance whereby deformation and expansion do not occur as a consequence of the heat of the molten resin injected from injection molding. Exemplary materials of the second synthetic resin film layer 2 include films of polyamide resins such as 6-nylon and 6,6-nylon, films of acrylic resins such as polymethyl methacrylate, acrylonitrile resin films, polyarylate resin films, polycarbonate resin films, and films of cellulosic resins such as cellulose diacetate, cellulose triacetate, and cellulose acetate butyrate.

The adhesive layer 3 laminately joins the first synthetic resin film layer 1 and the second synthetic resin film layer 2. It is necessary that the adhesive layer 3 be able to elongate in the same manner as that of the first and second synthetic resin film layers 1 and 2 in the molding of the transfer sheet without any release or deviation in the molding of the transfer sheet or in the injection molding of the film. Adhesives already described with respect to the single layer film can be used as materials of the adhesive layer 3.

The laminate 4 can be produced by applying an adhesive to one or both of the contact surfaces of the first and second synthetic resin film layers, and thereafter laminating by dry lamination or the like. Alternatively, the laminate 4 can be produced by melting and extruding an adhesive and contact bonding the synthetic resin films from both sides.

The thickness of the laminate 4 is from 50 to 200 micrometers, preferably from 50 to 100 micrometers. The thickness of the second synthetic resin film layer 2 of the laminate 4 is from 20% to 50%, preferably from 30% to 50% of the thickness of the laminate 4. If the thickness of the laminate 4 is less than the lower limit, it will be difficult to handle the laminate. If the thickness of the laminate is more than the upper limit, ununiform thickness is liable to occur when molding into a molded sheet. If the thickness of the second synthetic resin film layer is less than the lower limit, wrinkles will tend to occur when molding into a molded sheet. If the thickness of the second synthetic resin film layer is more than the upper limit, moldability will tend to be reduced and costs will be increased because highly heat-resistant resin film is generally expensive.

Such a laminate 4 meets all of the requirements, i.e., good dimensional stability in printing wherein the elongation is 5% or below in an atmosphere at a temperature of 80° C. or below; good formability wherein the draw ratio at a temperature of at least 100° C. is ½ or above; good heat resistance wherein the laminate withstands temperatures of 140° C. or above which are the temperatures of molten resins in injection molding; and the like.

The releasable layer 5, the printed pattern layer 6 and the adhesive layer 7 superposed thereon are respectively produced from the same materials as described above.

While the most preferred example of the present invention has been described hereinabove, one or several layers of the transfer sheet 1A shown in FIG. 1 can also be omitted as described hereinafter.

(a) The adhesive layer 3 which is an intermediate layer of the laminate 4 may be omitted when the first and second synthetic resin film layers can be laminated without any adhesive layer by heat fusion, high-frequency bonding or the like.

(b) The releasable layer 5 can be omitted when there is releasability between the second synthetic resin film layer 2 and the printed pattern layer 6 due to the selection of each material. In brief, any structure can be used provided that the laminate 4 surface on which the printed pattern layer 6 is applied has releasability during heat transfer.

(c) While the adhesive layer 7 is provided in order to cause adhesion between the printed pattern layer 6 and the injected molding resin during heat transfer to cause the printed pattern layer 6 to adhere to the surface of a molded product, the adhesive layer 7 heat-sensitively and adhesively functions, and therefore the printed pattern layer 6 can also function as the adhesive layer by using a vehicle in the printed pattern, or by replacing a part or all of the vehicle with the material which constitutes the adhesive layer 7. In such a case, the adhesive layer 7 can be omitted.

According to the present invention, a laminate obtained by using the first synthetic resin film layer having dimensional stability and formability on the side opposite the printed pattern, using the second synthetic resin film layer having heat resistance and formability on the side of the printed pattern, and laminating these layers is used as the base for the transfer sheet. Therefore the dimensional stability in producing the transfer sheet is excellent, and the formability of the transfer sheet is excellent. Moreover, a pattern can be imparted to the surface of a molded product without any problem by injection molding using the molded transfer sheet.

Further, the transfer sheet obtained from the film of the present invention has excellent dimensional stability, and therefore it makes possible necessary printing onto one transfer sheet in one transfer process by registering. In contrast, in the prior art, hot stamping is carried out, and thereafter letters, symbols, patterns and the like are silk screen printed.

In the present invention, in both cases of single layer films and multilayer films, a vacuum formed film may be integrally molded with other molded products or thermally bonded thereto and thereafter used as a product, as it is, without peeling off the base. In this case, a printing layer and an adhesive layer are provided on one surface of the base having vacuum formability, and a releasable layer is omitted. This embodiment is included within the purview of the present invention.

Heretofore, in a printing film to be subjected to vacuum forming, the portions of film exhibiting large elongation by vacuum forming have been treated by the following processes. In one process, letter or pattern printing onto such portions is avoided. In another process, letters or patterns reduced by conforming the previously calculated percent elongation are printed. However, even if the percent elongation during vacuum forming is previously calculated, the elongation ratio of the film is different at each portion and therefore it is difficult to reproduce the letters or patterns in accurate shape and size.

According to the present invention, a printing film for vacuum forming having letters and patterns in accurate shape and size can be provided by providing on the single layer or two-layer film as described above a layer which partially inhibits the elongation of the film during forming, and providing printed patterns.

Figure 2:
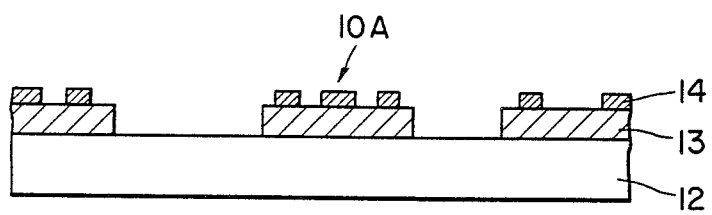
FIGS. 2 and 3 are respectively enlarged sectional views of examples of printing films for vacuum forming which are obtained by using a film according to the present invention as a base and providing on the film a layer which partially inhibits the elongation of the film during forming.

As shown in FIG. 2, a basic form of a printed film 10A for vacuum forming having a film of the present invention incorporated therein comprises a film 12 having dimensional stability, formability and heat resistance according to the present invention, a layer 13 of resin provided on a portion of at least one surface of the film 12 (which resin does not substantially deform under vacuum forming conditions), and a printed pattern layer 14 provided on the layer 13. The elongation of the film during vacuum forming can be partially inhibited.

The printing film for vacuum forming of this invention includes a modification which is used for transfer.

Figure 3:
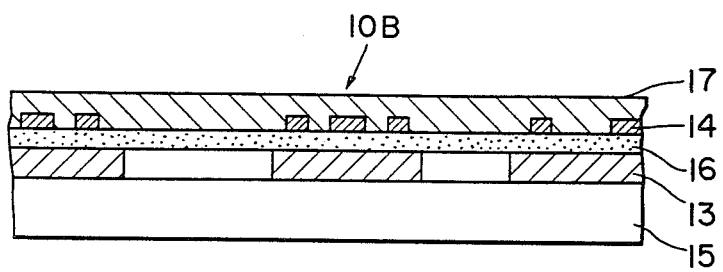

As shown in FIG. 3, a printing film 10B for vacuum forming which is used for transfer comprises a base 15 having vacuum formability, a layer 13 of a resin provided on one surface of the base 15 (which resin does not substantially deform under vacuum forming conditions), a releasable layer 16 provided on the layer 13, a printed pattern layer 14 provided on the releasable layer 16, and an adhesive layer 17 provided on the printed pattern layer 14 and the releasable layer 16. The printing layer can be accurately transferred to other molded products via the adhesive layer by partially inhibiting the elongation of the base during vacuum forming.

In the printing film 10A for vacuum forming shown in FIG. 2, letters or patterns are printed onto the portions wherein the elongation of the film during vacuum forming is inhibited. Accordingly, the film can be subjected to vacuum forming without straining its shape or without any elongation.

In the printing film for vacuum forming shown in FIG. 3, the action is the same as that of the printing film for vacuum forming shown in FIG. 2. Letters and patterns are printed onto the portions wherein the elongation of the base is inhibited. Accordingly, the base can be subjected to vacuum forming without straining its shape or without any elongation, and the printing layer can be transferred to other molded products.

In any mode of practice, the elongation of the film or base can be inhibited by providing the layer of the non-deformable resin only on the pattern-applied portions of the film or base.

In a modified example, the non-deformable resin layer and the releasable layer can be provided on the base having vacuum formability in any order. That is, in the example shown in FIG. 3, first, the resin layer 13 can be provided on the base 15 and then the releasable layer 16 can be provided on the resin layer 13. Alternatively, first, the releasable layer 16 can be provided on the base 15 and then the resin layer 13 can be provided on the releasable layer 16.

Further, a vacuum formed film may be integrally molded with other molded products or thermally bonded thereto and thereafter used as a product as it is without peeling off the base. In this case, a resin layer which inhibits the elongation of the base during vacuum forming is provided on one surface of the base having vacuum formability, and the printing layer and the adhesive layer is provided on the resin layer in this order.

Thus, the releasable layer is omitted. This mode of practice is also included within the scope of the present invention.

Representative resins which inhibit the elongation of the film without any deformation in vacuum forming of the film are formaldehyde resins, phenolic resins, amino resins, epoxy resins and polyurethane resins. Preferably, ultraviolet ray curing-type resins and electron beam curing-type resins are used. Thermoplastic resins such as polyester resins may also be used. These resins are provided by methods such as gravure printing, silk screen printing and offset printing in a manner such that they fit in with the shape and area of the printing layer formed thereon. The printing layer is formed by any of various known printing processes using conventional ink compositions. Suitable vehicles for ink compositions are selected from chlorinated polypropylene, ethylene-vinyl acetate copolymer, acrylic resins such as polyacrylate and polymethacrylate.

When a transfer film is to be formed, the materials of the releasable layer formed on the resin layer or base are, for example, thermoplastic adhesives such as acrylic adhesives such as polymethacrylate, polyethylene and cellulose resin and elastomer adhesives such as nitrile rubbers, styrene rubbers, and butyl rubbers.

Particularly, in the case of heat transfer, the same adhesive layer as described above acts heat-sensitively and adhesively, and therefore the adhesive layer may be omitted if suitable portions of the adhesives and vehicles for printing inks are composed of vehicles for printing inks.

The base film for three-dimensional conformability according to the present invention can be subjected to vacuum forming without changing the size and shape of the printed letters and patterns. "Processes for carrying out forming in consideration of elongation" include the following two procedures.

In one procedure, section paper-like printing is applied to sheets which are used for forming (the same sheets or similar sheets in physical properties, thickness and the like). Vacuum (air-pressure) forming of the sheet described above is then carried out in the same mold as that used during molding. That is, vacuum pack is prepared. The elongation and strain at each point are determined, and a scale-down plate is produced with consideration of elongation and strain on the basis of the data obtained.

In the other procedure, the vacuum (air-pressure) forming of the sheet as described above is carried out by using models wherein the draw ratio and corner curvature are sccessively varied. Forming differences due to the shape of the mold are measured. The data obtained are input into a computer. The degree of elongation and strain of the actual molded products is judged by means of the computer. A scale-down plate is produced according to the judgement.

Such films can be widely utilized for packaging various miscellaneous goods, and parts of automobiles and electric and electronic instruments, for housing and masking, and for injection pattern-formation (including both lamination and transfer).

As will be apparent from the detailed description of each mode of practice of the invention described above, the present film comprising the single layer film consisting of the copolymer or resin blend or the multi-layer film consisting of the first film and the second film has good dimensional stability during printing of the film, and therefore precise pattern printing can be carried out. The vacuum formability at a temperature of 100° C. or above is good and the heat resistance during injection molding at 140° C. or above is also excellent. Accordingly, by using the transfer film or affixture film obtained by employing such a film as a base film, a desired printing can be imparted to the surface of the molded product having a complex three-dimensional shape at the same time as forming.

The following non-limiting examples illustrate more fully the present invention.

EXAMPLE 1

Seventy % of a polyethylene terephthalate resin (manufactured by Yunichika, Japan) and 30% of a polyarylate resin "U Polymer" (manufactured by Yunichika, Japan) were blended, and the blend was molded by a casting process into a base film having a thickness of 50 microns. The physical properties of the resulting film were as follows:

| | |
|---|---|
| Percent elongation of the film at 80° C. | 5% |
| Draw ratio at a temperature of 100° C. or above | 3 |
| Film did not melt even when it came into contact with a 140° C. resin injected from the injection molding machine. | |

The following raw materials were then blended to prepare a releaser composition.

| | |
|---|---|
| Thermoplastic acrylic resin | 70 parts |
| Vinyl chloride-vinyl acetate copolymer resin | 30 parts |
| Polyethylene wax | 3 parts |
| 1/1 Toluene/MEK | 200 parts |

The releaser composition described above was gravure coated onto the base film described above to form a releasable layer.

The following raw materials were blended to prepare a printing ink composition.

| | |
|---|---|
| Thermoplastic acrylic resin | 30 parts |
| Rubber chloride | 30 parts |
| Pigment | 30 parts |
| Chlorinated paraffin | 5 parts |
| Surfactant | 0.5 part |
| Toluene/ethyl acetate | 260 parts |

The printing ink composition was applied onto the releasable layer by a gravure printing process to form a printing layer.

The following raw materials were blended to prepare an adhesive composition.

| | |
|---|---|
| Chlorinated polypropylene | 20 parts |
| Toluene | 80 parts |

The adhesive composition was gravure coated onto the printing layer to form an adhesive layer.

The transfer film formed in the order described above was used. Vacuum forming was carried out in an injection mold at a temperature of 110° C., and thereafter injection molding was carried out in the same mold at a resin temperature of 200° C. A desired pattern could be formed on the surface of the molded product having a complex three-dimensional shape at the same time as forming.

When the releasable layer was removed from the transfer film having the structure described above, a molded product wherein the base film described above was secured to the surface of the molded product obtained by injection molding, along with the printing layer provided at the back side of the base film was obtained.

EXAMPLE 2

A polyamide resin adhesive was gravure coated onto one surface of a polyvinyl chloride resin film (rigid) having a thickness of 100 micrometers, and a 6-nylon film having a thickness of 40 micrometers was dry laminated onto the coated surface.

The physical properties of the resulting laminated film were as follows:

| | |
|---|---|
| Percent elongation at 80° C. | 3% |
| Draw ratio at 100° C. | 2 |
| The film did not melt even when it came into contact with a molten resin having a temperature of 140° C. | |

Thus, the resulting laminated film had excellent dimensional stability, formability, and heat resistance.

Compositions containing a polymethyl methacrylate resin as a vehicle were applied to the surface of the 6-nylon film of the resulting composite film to form a releasable layer, a printed pattern layer and an adhesive layer. Thus, a transfer sheet was produced.

This transfer sheet was subjected to vacuum forming, and the sheet thus formed was placed in a metal mold, in which injection molding was carried out to obtain a molded product having a pattern.

In the steps described above, there was no out of printing register of the transfer sheet, and the vacuum forming and injection molding were successfully carried out.

For comparison, the procedure described above was carried out except that a polyvinyl chloride resin film having a thickness of 140 micrometers alone and a 6-nylon film having a thickness of 140 micrometers alone were independently used. When the polyvinyl chloride resin film was used, out of printing register was absent, and vacuum forming was successfully carried out. However, the base of the transfer sheet was perforated during injection molding, and the portions having no patterns were present in the molded product. When the 6-nylon film was used, vacuum forming and injection molding per se were successfully carried out. However, due to out of printing register of the transfer sheet, the patterns imparted to the molded product exhibited color drift.

EXAMPLE 3

A 90% acrylonitrile - 10% methyl methacrylate copolymer film having a thickness of 40 micrometers was prepared. Its physical properties were as follows:

| | |
|---|---|
| Percent elongation at 80° C. | 2% |
| Draw ratio | 4 |
| The film did not melt at a temperature of 140° C. | |

This film was used and an ultraviolet ray-curing resin was gravure coated onto predetermined portions wherein the elongation at one surface of the film was to be inhibited. The coated film was cured by irradiation thereof with ultraviolet rays.

Releasable, printing ink and adhesive layers which were compositions containing polymethyl methacrylate as a vehicle and other components were formed on the resin layer described above to prepare a transfer film.

The resulting transfer film was subjected to vacuum forming. The printed letter and pattern portions were formed without any elongation and strain. This plastic film was suitable as a transfer film for the surface of plastic molded products. Further, the printing film having no releasable layer was suitable for lamination to the surface of plastic molded products.

What is claimed is:

1. A base film for three-dimensional conformability having dimensional stability, formability and heat resistance, said base film comprising a multilayer laminate having a first film layer with dimensional stability such that the percent elongation of said first film layer is 5% or less at a drying temperature of 80° C. or below and with formability such that the draw ratio of said first film layer is one half or more at a temperature of at least 100° C.; and a second film layer with heat resistance such that no melting of said second film layer occurs even if said second film layer is contacted with a molten resin having a temperature of 140° C. or more and with formability such that the draw ratio of said second film layer is one half or more at a temperature of at least 100° C.

2. A base film for three-dimensional conformability according to claim 1, said first film layer comprising a material selected from the group consisting of polyvinyl chloride resin films, acrylic resin films, non-oriented polyethylene terephthalate resin films and non-oriented polypropylene resin films, and said second film layer comprising a material selected from the group consisting of polyamide resin films, acrylic resin films, acrylonitrile resin films, polyarylate resin films, polycarbonate films and films of cellulosic resins.

3. A transfer sheet comprising:
   a base film for three-dimensional conformability having dimensional stability, formability and heat resistance, said base film comprising a multilayer laminate having a first film layer with dimensional stability such that the percent elongation of said first film layer is 5% or less at a drying temperature of 80° C. or below and with formability such that the draw ratio of said first film layer is one half or more at a temperature of at least 100° C.; and a second film layer with heat resistance such that no melting of said second film layer occurs even if said second film layer is contacted with a molten resin having a temperature of 140° C. or more and with formability such that the draw ratio of said second film layer is one half or more at a temperature of at least 100° C., and
   a printed pattern provided on the side of the second film layer of the base film.

4. A transfer sheet according to claim 3 wherein said first film layer comprising a material selected from the group consisting of polyvinyl chloride resin films, acrylic resin films, non-oriented polyethylene terephthalate resin films and non-oriented polypropylene resin films, and said second film layer comprising a material selected from the group consisting of polyamide resin films, acrylic resin films, acrylonitrile resin films, polyarylate resin films, polycarbonate films and films of cellulosic resins.

* * * * *